(12) United States Patent
Zhang et al.

(10) Patent No.: US 10,193,986 B2
(45) Date of Patent: Jan. 29, 2019

(54) METHOD AND APPARATUS FOR PRESENTING GEOGRAPHICAL LOCATION

(71) Applicant: Tencent Technology (Shenzhen) Company Limited, Shenzhen (CN)

(72) Inventors: Wenbin Zhang, Shenzhen (CN); Pinlin Chen, Shenzhen (CN); Yuyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 320 days.

(21) Appl. No.: 15/178,022

(22) Filed: Jun. 9, 2016

(65) Prior Publication Data
US 2016/0294958 A1 Oct. 6, 2016

Related U.S. Application Data

(63) Continuation of application No. PCT/CN2015/071443, filed on Jan. 23, 2015.

(30) Foreign Application Priority Data

Apr. 25, 2014 (CN) .......................... 2014 1 0173061

(51) Int. Cl.
| | | |
|---|---|---|
| *H04W 4/02* | (2018.01) | |
| *H04W 4/38* | (2018.01) | |
| *G01C 21/00* | (2006.01) | |
| *G01C 21/36* | (2006.01) | |

(Continued)

(52) U.S. Cl.
CPC ............ *H04L 67/18* (2013.01); *G01C 21/005* (2013.01); *G01C 21/3667* (2013.01);
(Continued)

(58) Field of Classification Search
CPC ......... H04L 67/18; H04L 67/10; H04L 51/04; G01C 21/005; G01C 21/3667; G10L 15/26; H04W 4/38; H04W 4/02
See application file for complete search history.

(56) References Cited

U.S. PATENT DOCUMENTS

| | | | | |
|---|---|---|---|---|
| 2009/0325603 | A1* | 12/2009 | Van Os | .................... H04W 4/02 455/456.2 |
| 2010/0029305 | A1* | 2/2010 | Gupta | .................... G01C 21/20 455/466 |

(Continued)

FOREIGN PATENT DOCUMENTS

| | | |
|---|---|---|
| CN | 101311678 A | 11/2008 |
| CN | 102223602 A | 10/2011 |
| CN | 102404685 A | 4/2012 |

OTHER PUBLICATIONS

Translation of specification of CN 101311678 pp. 1-3.*

(Continued)

*Primary Examiner* — Larry D Donaghue
(74) *Attorney, Agent, or Firm* — Brinks Gilson & Lione

(57) ABSTRACT

Method and device of sharing location information in a social network application are disclosed. The method includes: a user device providing an instant messaging interface of a social network application at the user device; detecting, within the instant messaging interface, a trigger input associated with location information from a first user of the first user device; in response to the trigger input associated with location information, obtaining a map based on the trigger input; and sharing the map with a second user device through the social network application, enabling the second user device to display the map in a corresponding instant messaging interface of the social network application executed at the second user device.

20 Claims, 19 Drawing Sheets

(51) Int. Cl.
  *G10L 15/26* (2006.01)
  *H04L 12/58* (2006.01)
  *H04L 29/08* (2006.01)
  *H04M 1/725* (2006.01)

(52) U.S. Cl.
  CPC .............. *G10L 15/26* (2013.01); *H04L 51/04* (2013.01); *H04L 67/10* (2013.01); *H04W 4/02* (2013.01); *H04W 4/38* (2018.02); *H04M 1/7255* (2013.01); *H04M 1/72547* (2013.01); *H04M 1/72552* (2013.01)

(56) References Cited

U.S. PATENT DOCUMENTS

| | | | | |
|---|---|---|---|---|
| 2011/0320114 A1* | 12/2011 | Buxton | .............. | G01C 21/3608 701/439 |
| 2014/0215330 A1* | 7/2014 | Lee | ...................... | G09B 29/007 715/703 |
| 2014/0365944 A1* | 12/2014 | Moore | .................. | G06F 3/0484 715/772 |
| 2015/0141060 A1* | 5/2015 | Shan | ...................... | H04W 4/21 455/550.1 |
| 2017/0160890 A1* | 6/2017 | Sung | .................... | G06F 3/0482 |

OTHER PUBLICATIONS

Translation of claims of CN 101311678 pp. 1-5.*
Translation of the specification of CN 101311678 (Year: 2008).*
Translation of the claims of CN 101311678 (Year: 2008).*
International Search Report and the Written Opinion of International PCT Application No. PCT/CN2015/071443, dated May 6, 2015, 14 pages.

* cited by examiner

Client Device 604

METHOD AND APPARATUS FOR PRESENTING GEOGRAPHICAL LOCATION

CROSS REFERENCE OF RELATED APPLICATIONS

This application is a continuation of International Application No. PCT/CN2015/071443, filed on Jan. 23, 2015, which claims priority to Chinese Patent Application No 201410173061.8, titled "METHOD AND APPARATUS FOR PRESENTING GEOGRAPHICAL LOCATION" filed on Apr. 25, 2014, which are incorporated by reference in their entireties.

TECHNICAL FIELD

The disclosed implementations relate generally to the field of information processing, and in particular, to method and apparatus for presenting geographical locations.

BACKGROUND

Frequently, users of social network applications discuss about addresses and locations in their conversations and interactions. Users who do not know the locations or corresponding directions extremely well need to close the social network applications and check the locations in maps or map applications. When users discuss them, they often must find the addresses for the locations they refer to and type the location or describe the location to the other users, as shown in FIG. 1. The process is burdensome and frustrates natural communication among users. Therefore, it is desirable to have a method with which users of social network applications can conveniently and intuitively communicate location information.

SUMMARY

In accordance with some implementations of the disclosed technology, a method of sharing location information in a social network application is disclosed. The method comprises: a first user device (e.g., client device 604, FIGS. 6 and 8-10) providing an instant messaging interface of a social network application at the first user device; detecting, within the instant messaging interface, a trigger input associated with location information from a first user of the first user device; in response to the trigger input associated with location information, obtaining a map based on the trigger input; and sharing the map with a second user device through the social network application, enabling the second user device to display the map in a corresponding instant messaging interface of the social network application executed at the second user device.

In some embodiments, a user device (e.g., client device 604, FIGS. 6 and 8-10), includes one or more processors, and memory storing one or more programs for execution by the one or more processors, the one or more programs include instructions for performing the operations of any of the methods described herein.

In some embodiments, a non-transitory computer readable storage medium storing one or more programs, the one or more programs comprising instructions, which, when executed by a user device (e.g., client device 604, FIGS. 6 and 8-10), cause the user device to perform the operations of any of the methods described herein. In some embodiments, a user device (e.g., client device 604, FIGS. 6 and 8-10) includes means for performing, or controlling performance of, the operations of any of the methods described herein.

Various advantages of the present application are apparent in light of the descriptions below.

BRIEF DESCRIPTION OF DRAWINGS

The aforementioned implementation of the application as well as additional implementations will be more clearly understood as a result of the following detailed description of the various aspects of the technology when taken in conjunction with the drawings. Like reference numerals refer to corresponding parts throughout the several views of the drawings.

DETAILED DESCRIPTION

In order to make the objects, technical scheme and advantages of the present application more clear, embodiments of the present application will be described in further detail with reference to the accompanying drawings.

Before giving a detailed explanation of the embodiments of the present application, explanation will first be made to typical application scenarios of the present application.

In accordance with some embodiments, the client device receives metadata information (e.g., data related to location information) sent by other client devices and presents a map area including other users' geographical locations on a communication presenting interface (i.e., chat window interface) according to the metadata information of other client devices. When chatting or browsing a chat log later, the user may preview on the communication presenting interface the presentation effect of a geographical location to be presented on the map without having to click into a map page.

In accordance with some embodiments, when publishing personal information on a personal information display platform, the user may also present the map area including the user's geographical location according to the metadata information of the client device so as to allow friends of the user to know conveniently the location of the user when viewing the information. For example, if the user publishes a picture on the personal information display platform, then a map area including the geographical location of the user is presented in the form of a small picture below the picture.

Figure 1:
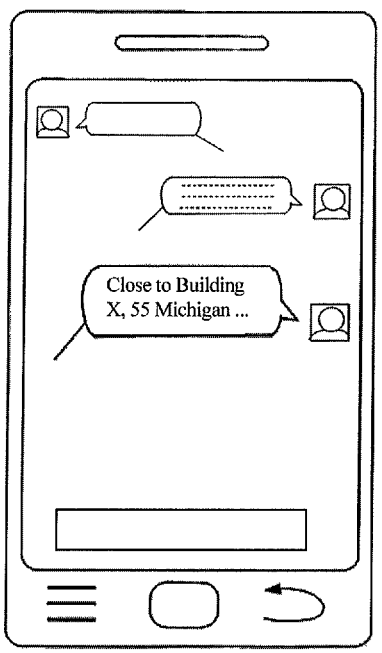
FIG. 1 is a schematic diagram of conventional geographical location presentation in a social network application.
Figure 2:
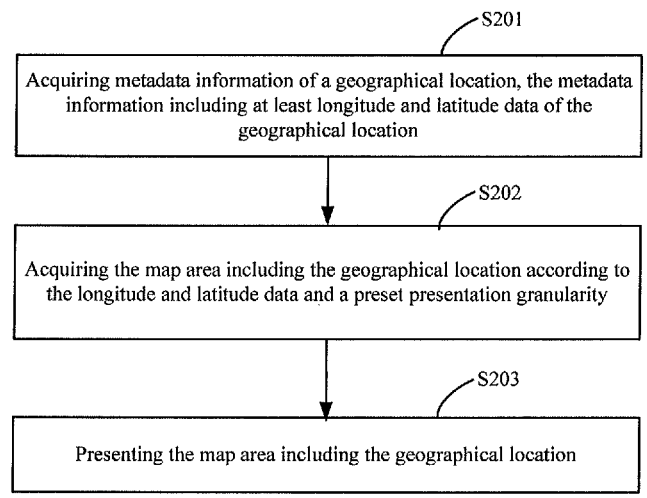
FIG. 2 is a flow chart of a method for presenting a geographical location in accordance with some embodiments.

FIG. 2 is a flow chart of a method for presenting a geographical location in accordance with some embodiments. The method comprises the following steps.

S201: acquiring metadata information of a geographical location to be presented, the metadata information including at least longitude and latitude data of the geographical location.

S202: acquiring the map area including the geographical location according to the longitude and latitude data and a preset presentation granularity.

S203: presenting the map area including the geographical location.

In accordance with some embodiments, acquiring the metadata information of the geographical location comprises: receiving the metadata information of the geographical location sent by other terminals; or acquiring the metadata information of the current geographical location of the terminal and taking the metadata information as that of the geographical location.

In accordance with some embodiments, acquiring the map area including the geographical location according to the longitude and latitude data and the preset presentation granularity comprises: acquiring a map corresponding to the presentation granularity; determining the display location of the geographical location in the acquired map according to the longitude and latitude data; and taking the display location as a center and taking a screenshot of the map according to the size of the preset presentation box to obtain the map area including the geographical location.

In accordance with some embodiments, presenting the map area including the geographical location comprises: presenting the map area including the geographical location in the preset presentation box on a presentation interface. In some embodiments, the map area includes a display mark, address information in text and geographical landmarks of surroundings of the geographical location.

In accordance with some embodiments, before acquiring the map area including the geographical location according to the longitude and latitude data and the preset presentation granularity, the client device creates a map control loading thread to load a map control.

In accordance with some embodiments, acquiring the map area comprises: loading the map through the map control; and acquiring the map area including the geographical location from the loaded map through the map control according to the presentation granularity and the longitude and latitude data.

Figure 3:
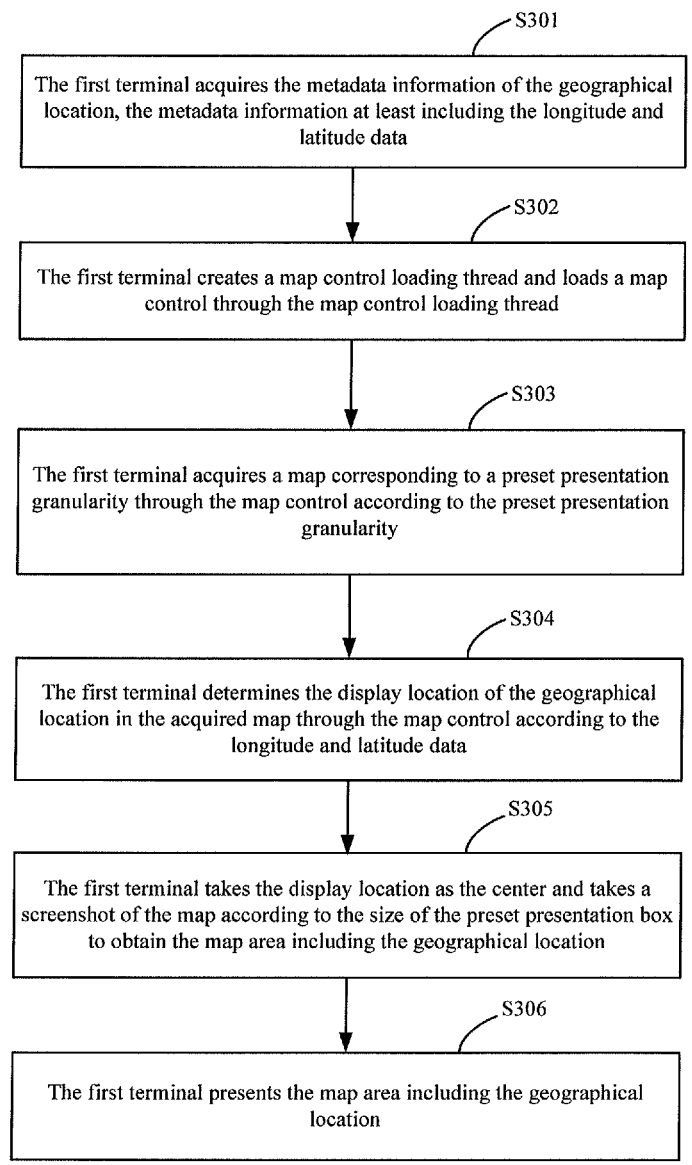
FIG. 3 is a flow chart of a method for presenting a geographical location in accordance with some embodiments.

FIG. 3 is a flow chart of a method for presenting a geographical location in accordance with some embodiments. The method, which is executed by a first terminal (e.g., client device 604, FIGS. 6 and 8-10) comprises the following steps.

In accordance with some embodiments, in a step S301, the first terminal acquires the metadata information of a geographical location to be presented, the metadata information at least including the longitude and latitude data of the geographical location.

In some embodiments, the metadata information includes at least the longitude and latitude data of the geographical location. In some embodiments, the metadata information may also include other data, for example, the time at which the longitude and latitude data is acquired and the like.

Furthermore, when acquiring the metadata information of the geographical location, the first terminal may specifically adopt the following two ways. In the first way, the first terminal receives the metadata information of the geographical location sent by a second terminal and takes the metadata information as that of the geographical location. As for the first way, the second terminal refers to another terminal that communicates with the first terminal.

In accordance with some embodiments, the first terminal may receive the metadata information sent by the second terminal and presents the geographical location of the second terminal on the communication presenting interface of the first terminal according to the metadata information of the second terminal. In some embodiments, the metadata information of the geographical location sent by the second terminal may be acquired by a GPS (Global Positioning System) software or plug-in embedded in the second terminal. For example, the longitude and latitude information of the geographical location is in the following form: (* longitude: *° *'*", *latitude: *° *'*").

In the second way, the first terminal acquires the metadata information of its current location and takes the metadata information as that of the geographical location. For example, when communicating with the user of the second terminal, the first user may be in a completely new place and have no idea of the current geographical location. In this situation, in order to allow the first user to have a general understanding of the current geographical location and the surrounding environment, the GPS software or plug-in embedded in the first terminal may also be used to acquire the metadata information of the current geographical location of the first terminal. And in the later process, the first terminal presents its geographical location on its communication presenting interface according to the metadata information acquired.

In accordance with some embodiments, in a step S302, the first terminal creates a map control loading thread and loads a map control through the map control loading thread. In accordance with some embodiments, in the later process, the map area including the geographical location will be determined by the map control, so that after acquiring the metadata information of the geographical location, the first terminal needs also to create a map control loading thread first to load the map control so as to acquire a map area corresponding to the metadata information.

In some embodiments, when creating the map control loading thread, a thread creation tool may be used by a background system of the first terminal. When the map control is loaded through the map control loading thread, it may be loaded from a specific server storing the map control.

In accordance with some embodiments, in a step S303, the first terminal acquires a map corresponding to a preset presentation granularity through the map control according to the preset presentation granularity.

In accordance with some embodiments, the preset presentation granularity refers to an administrative region presentation level of the map, i.e., the level of detail of the geographical location presented on the map. The administrative region presentation level may be classified into the following categories: country—only the geographical mark and the name of the country are presented on the map; province—as for each country, not only the geographical mark and name of the country but also that of a province of the country are presented on the map; city—not only the geographical mark but also the name of the country, the province and the city are presented on the map; district and county—not only the geographical mark but also the name of the country, the province, the city and the district and county are presented on the map; street—not only the geographical mark but also the name of the country, the province, the city, the district and county and the street are presented on the map; and house number—not only the geographical mark but also the name of the country, the province, the city, the district and county and the street, and the house number are presented on the map.

In accordance with some embodiments, the presentation granularity may be set by the background of the first terminal itself. In some embodiments, the preset presentation granularity may also be set by the second terminal and carried in the metadata information sent by the second terminal to the first terminal. After the first terminal receives the metadata information including the preset presentation granularity, if the background of the first terminal does not set the presentation granularity, then the presentation level of administrative region of the map to be loaded will be determined directly according to the preset presentation granularity included in the metadata information loads. If the background of the first terminal sets also the presentation granularity, a choice will be made between the two presentation granularities, or a finer presentation granularity will be selected to determine the presentation level of administrative region of the map to be loaded.

In accordance with some embodiments, after receiving the metadata information of the geographical location sent by the second terminal, the first terminal prompts options with various presentation granularities, and the user selects one from the various presentation granularities. In some embodiments, before sending the metadata information of the geographical location to the first terminal, the second terminal prompts options with various presentation granularities, and a second user selects one from the various presentation granularities. For example, a prompt box of setting the presentation granularity pops up on the display interface of the first terminal or the second terminal for users to set the presentation granularity. In accordance with some embodiments, granularities are chosen by preset criteria set by the first terminal or the second terminal. For example it may be "only select the presentation granularity finer than a preset threshold."

In some embodiments, after the map control is created, when loading a map, the map control determines what administrative region presentation level of map to load according to the preset presentation granularity. If the preset presentation level is the district and county, the map control loads a map including the geographical mark and name of the country, the province, the city and the district and county.

Further, when determining the presentation level of administrative region of the map to be loaded according to the preset presentation granularity, a preliminary estimate of the administrative regions included in the map to be loaded could also be made according to the longitude and latitude data of the geographical location, in order to reduce the time for the map loading and the storage space occupied by the map. For example, if the longitude and latitude data of the geographical location lies in the longitude and latitude range covered by the Beijing city, only the map of Beijing city including various administrative region presentation levels is loaded when loading the map according to the preset presentation granularity.

In accordance with some embodiments, in a step S304, the first terminal determines the display location of the geographical location in the acquired map through the map control according to the longitude and latitude data.

In order to determine the specific location of the geographical location in the map, the first terminal, according to the longitude and latitude data, controls the map control to determine the display location of the geographical location in the map acquired.

When determining the display location of the geographical location in the map acquired, the map control may compare the longitude and latitude data with the longitude and latitude data of each geographical mark. If the longitude and latitude data of a certain geographical mark matches with the longitude and latitude data, the location of the geographical mark will be determined as the display location of the geographical location.

In accordance with some embodiments, in a step S305, the first terminal takes the display location as the center and takes a screenshot of the map according to the size of the preset presentation box to obtain the map area including the geographical location. On one hand, the size of the presentation interface of the first terminal is a limitation. On the other hand, as map area too far from the display location of the geographical location is of little use for the first user.

Figure 5A:
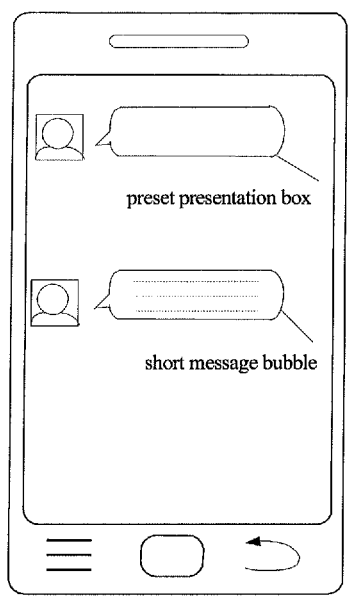
FIG. 5A is a schematic diagram of a preset presentation box in accordance with some embodiments.

Moreover, as shown in FIG. 5A, the preset presentation box is included in a message bubble on the first terminal. In some embodiments, however, the size of the preset presentation box may also be larger or smaller than a message bubble. Since the message bubbles have multiple sizes, the size of the preset presentation box may be set according to any one of the plurality of message bubbles when being set. In some embodiments, the sizes of text bubbles are determined by sizes of maps.

Figure 5B:
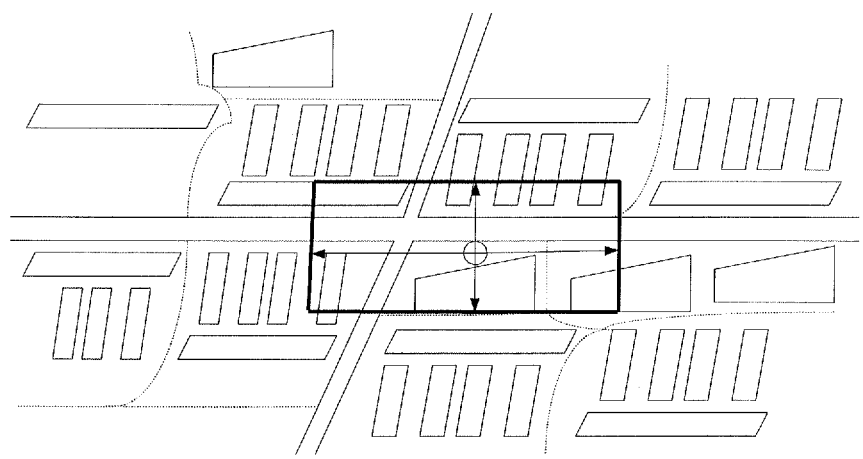
FIG. 5B is a schematic diagram of map area screenshot in accordance with some embodiments.

As shown in FIG. 5B, in some embodiments, the display location of the geographical location should be taken as the center to take the screenshot. In some embodiments, when making a screenshot of the surrounding area, the display location of the geographical location is taken as the center first, and one-half of the width and one-half of the length of the preset presentation box are used for determining four boundary lines. The area surrounded by the four boundary lines is the map area including the geographical location, and the cross-point of diagonal lines is the display location of the geographical location.

Figure 5C:
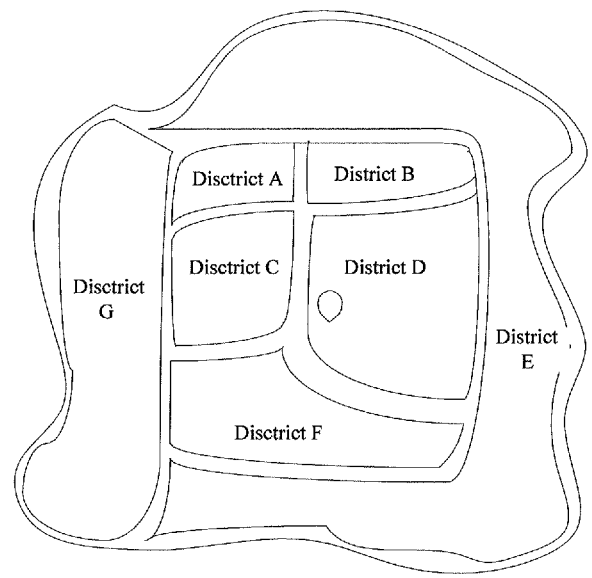
FIG. 5C is a schematic diagram of map area screenshot in accordance with some embodiments.
Figure 5D:
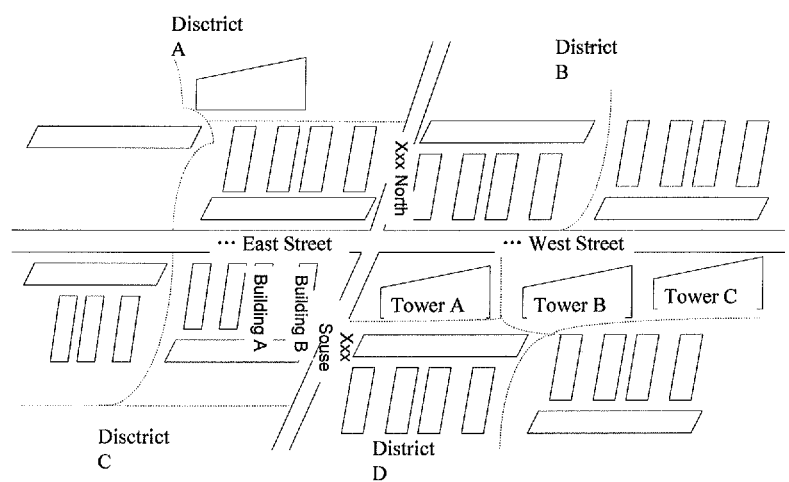
FIG. 5D is a schematic diagram of map area screenshot in accordance with some embodiments.

In accordance with some embodiments, different presentation levels of preset presentation granularities lead to different map areas including the geographical location. Taking the preset presentation granularity of the district category and the street category as an example, as shown in FIG. 5C, if the preset presentation granularity is district category, the lowest-level administrative region of the map area obtained is district, and no streets and house numbers and the like are included under the district. As shown in FIG. 5D, if the preset presentation granularity is street category, the lowest-level administrative region of the map area obtained is street, i.e., marks of the street and buildings in the street included in each district are presented.

Figure 5E:
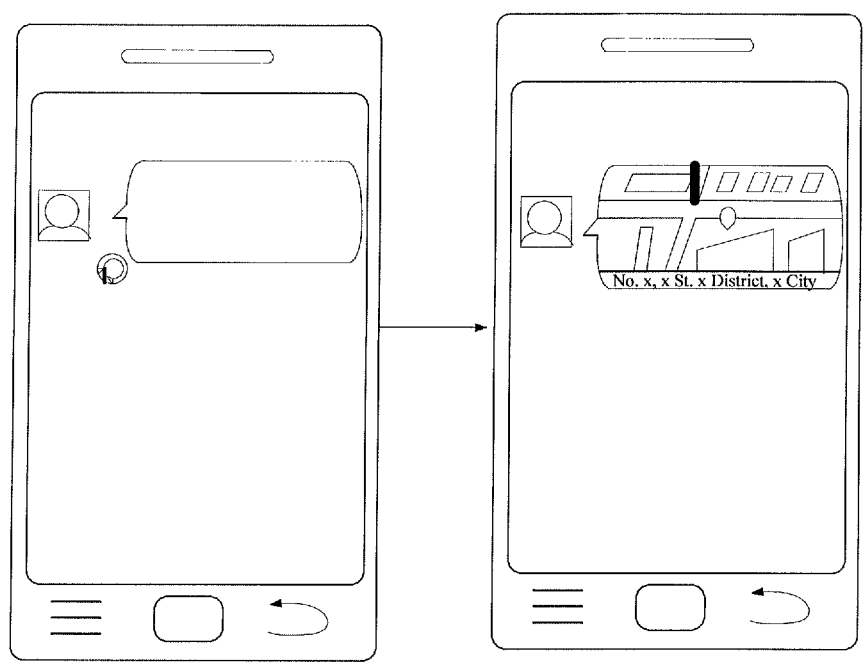
FIG. 5E is a schematic diagram of geographical location presentation in accordance with some embodiments.

In accordance with some embodiments, in a step S306, the first terminal presents the map area including the geographical location. In accordance with some embodiments, the first terminal presents the map area including the geographical location in the preset presentation box of the presentation interface. In some embodiments, the presentation interface typically refers to the communication presenting interface, i.e., a conversation interface, or a chat window. As shown in FIG. 5E, on the presentation interface (chat window), the preset presentation box will be presented on the presentation interface prior to the map area is obtained. There is no content in the preset presentation box, and a circular loading icon may be displayed beside the preset presentation box to inform the first terminal user that the map area including the geographical location is being loaded. After the map area including the geographical location is obtained, it will be covered on the preset presentation box for display.

In some embodiments, the map area includes the display mark, the address information in text and the geographical marks of surroundings of the geographical location. The display mark of the geographical location may be a bubble-like mark used for marking the geographical location. The address information in text form of the geographical location is used for marking the detailed address information of the geographical location. The geographical marks of surroundings of the geographical location are used for marking the buildings, streets and the like surrounding the geographical location.

It should be noted that, the presentation interface may also be an interface for presenting personal information. When publishing personal information on the personal information display platform, the first terminal user may also adopt a geographical location presentation method similar to the above-mentioned steps to present its geographical location. For example, if the first terminal user publishes a picture on the personal information display platform, then the map area including the geographical location of the first terminal user is presented in the form of a small picture below the picture. Moreover, when leaving a message or publishing personal information on a network social platform such as Weibo, online forum, Facebook, and so on, the first terminal user may also present its geographical location with the steps described above.

Figure 4:
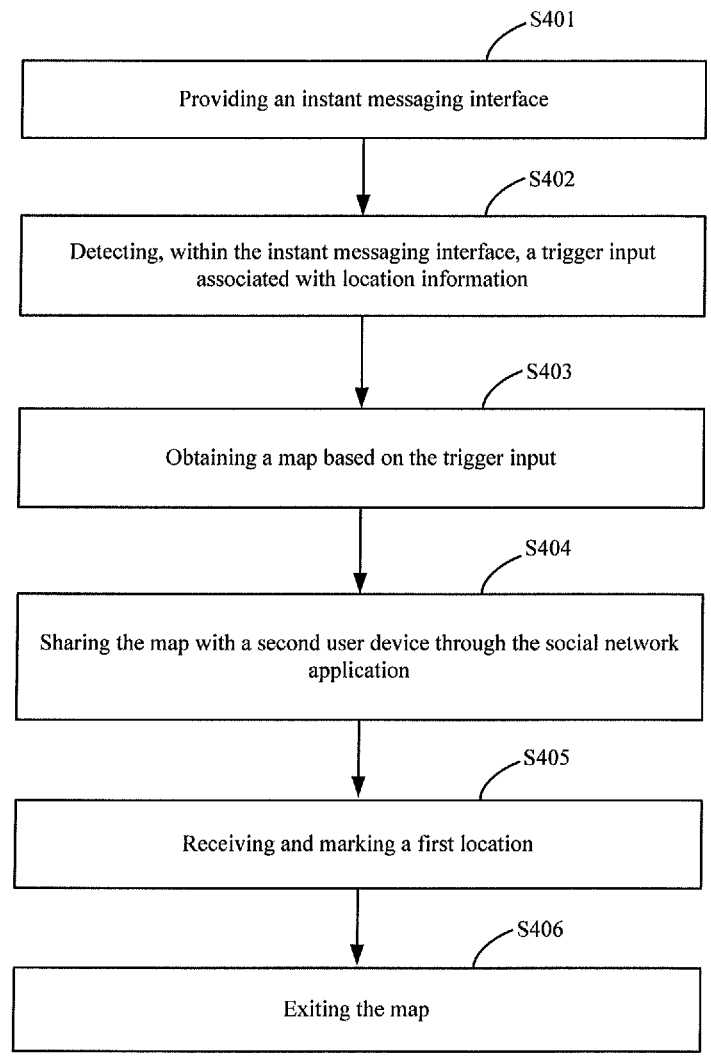
FIG. 4 is a flow chart of a method for sharing location information in a social network application in accordance with some embodiments.

FIG. 4 is a flowchart of a method for sharing location information in a social network application in accordance with some embodiments. In some embodiments, the method is performed at a first user device (e.g., client device 604, FIGS. 6 and 8-10) of having one or more processors and memory for storing one or more programs to be executed by the one or more processors.

In accordance with some embodiments, in a step S401, the first user device provides an instant messaging interface of a social network application at the user device, as shown in FIG. 5A.

In accordance with some embodiments, in a step S402, the first user device detects, within the instant messaging interface, a trigger input associated with location information from a first user of the first user device.

In accordance with some embodiments, detecting the trigger input associated with location information further comprises: receiving a user instruction for sending a map interaction request. The user may send a map interaction request by selecting a map interaction affordance, e.g., as the "start map interaction" button shown in FIG. 5G. The map interaction request, once accepted by the second device, will start a map interaction. In a map interaction among multiple devices, change or marking in the map from one device will automatically show in the map of all other devices. In a map interaction, users could have a voice call or message conversations. The user may click a button or type in "start map interaction" or other predetermined text to send a map interaction request.

Figure 5F:
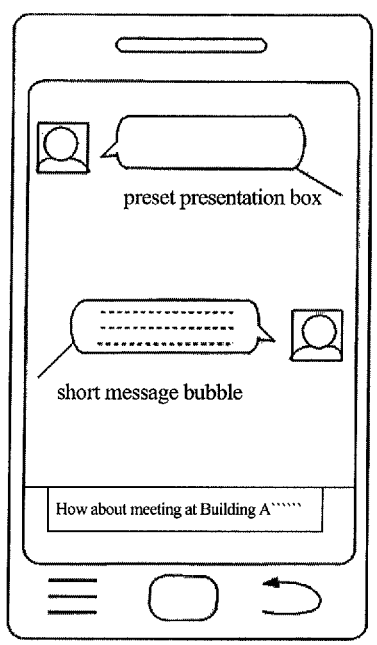
FIG. 5F is a schematic diagram of a user interface for sharing location information in accordance with some embodiments.

In some embodiments, the trigger input is not an explicit instruction of starting a map interaction. Rather, the first user device detects the need of users from their conversations. In accordance with some embodiments, detecting the trigger input associated with location information further comprises: detecting a chat message input containing one or more keywords associated with location information. For example, the chat message input may include "let's meet at", "Meet me at" "Where should we meet? . . . How about . . . ." The input does not need to be a completed message. It can be a partially typed message that has not yet been sent out by the first user. For example, FIG. 5F shows a partially written message that the first user device detects as a trigger for starting a map interaction. In some embodiments, the message can be a completed message that has been sent by the first user. In some embodiments, when these location or position phrase appear, the first user device detects them as trigger input and either begin to obtain a map as described in S403 or asks the user whether the first user device should present a map.

In accordance with some embodiments, the chat message input is a voice message input. When a user inputs a voice message, the first user device converts the voice message input into text, extracts an address from the text, marks a location corresponding to the address in the map as the first location, and displays the address in a manner to associate the address with the first location in the map. For example, the first user device displays the text address in a bubble pointing to the first location.

Figure 5G:
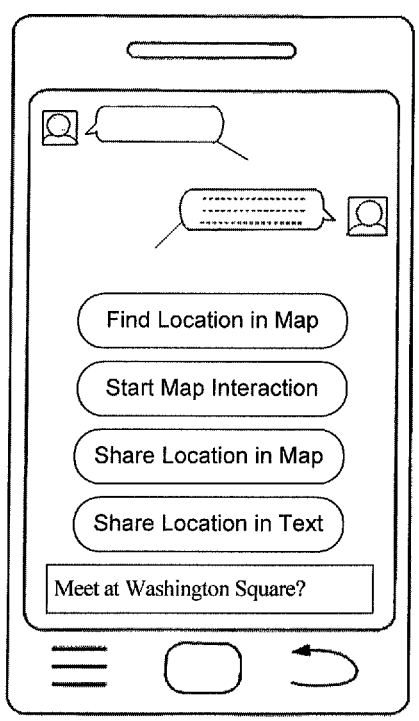
FIG. 5G is a schematic diagram of a user interface for sharing location information in accordance with some embodiments.

In accordance with some embodiments, detecting the trigger input associated with location information further comprises: receiving a user instruction for sharing a current location of the first user device. For example, during a conversation, the user enters a user instruction of sharing current location. The first user device automatically enters a map interaction mode once detecting the user instruction for sharing the current location. In some embodiments, the first user device presents options to the user on whether the user wants to share the current location in text or in map, e.g., as shown in FIG. 5G. In some embodiments, the first user device obtains the current location of the first user device; and marks the current location of the first user device in the map as the first location.

In accordance with some embodiments, in a step S403, in response to the trigger input associated with location information, the first user device obtains a map based on the trigger input.

In some embodiments, in response to the detecting the chat message input associated with location information, the first user device displays the map within the instant message interface at the first user device, as shown in FIGS. 5H-5L. For example, the first user wants to discuss a first location with the second user. When the first user types: "how do you think of the restaurant near F street?" The first user device displays the map in the instant message interface with the F street and marking all the restaurants. The first user is then able to directly select the restaurant, instead of having to find and type in the specific name and address of the restaurant.

Figure 5H:
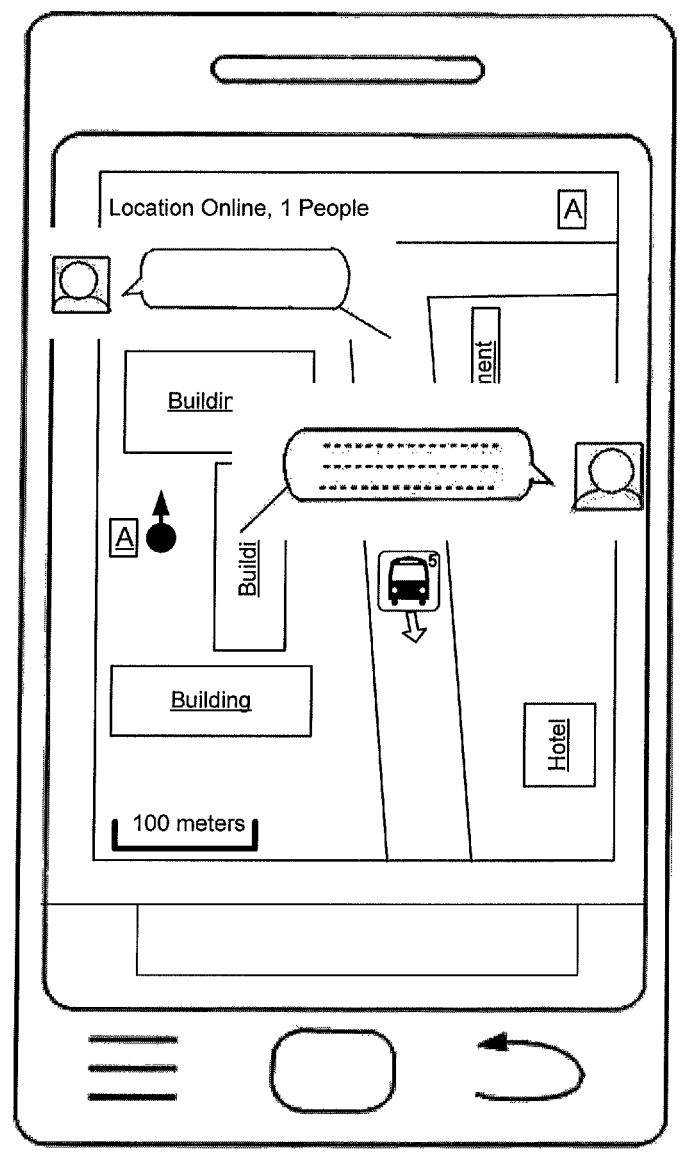
FIG. 5H is a schematic diagram of a user interface for sharing location information in accordance with some embodiments.
Figure 5I:
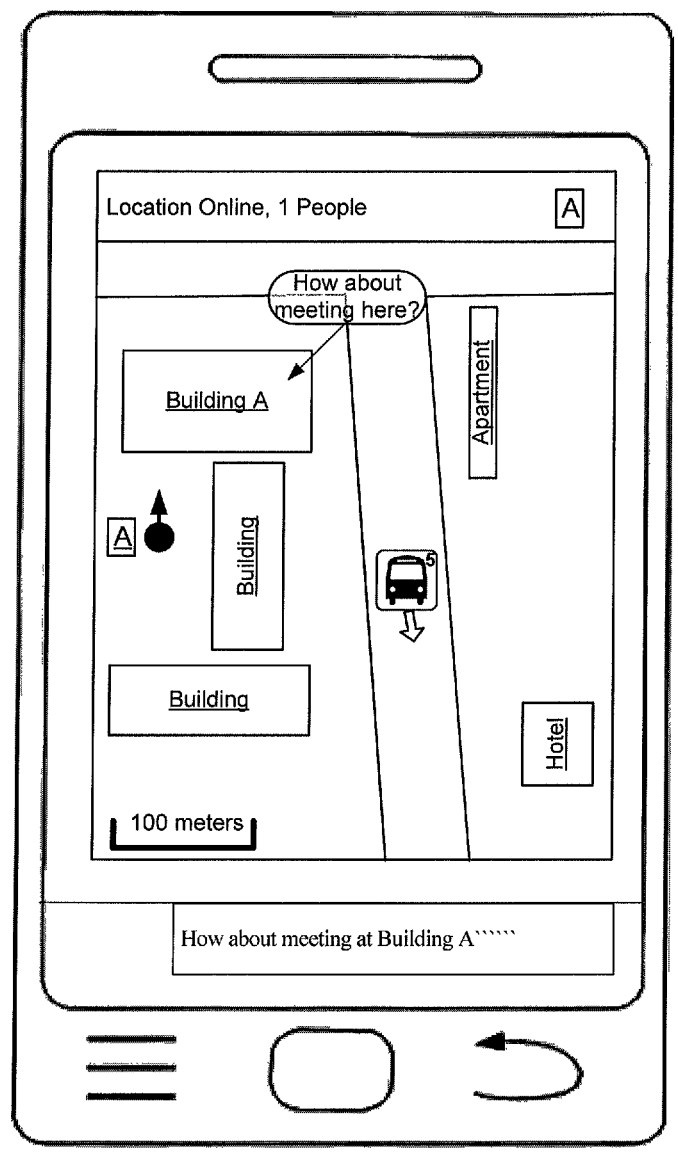
FIG. 5I is a schematic diagram of a user interface for sharing location information in accordance with some embodiments.

In accordance with some embodiments, the map replaces the normal chat interface with message bubbles, but the input box can still be shown, as shown in FIG. 5H. The first user device receives a user input selecting a first location on the map displayed in the instant message interface and automatically fills in a textual description of the first location into the message input box, as shown in FIG. 5I. The textual description can be an address, a name of the location (e.g., "crown plaza, Starbucks, etc.). For example, after user A selects the restaurant, the first user device automatically fills the input box with the name, address, telephone number and website to the input box. In some embodiments, the map is displayed within the corresponding instant messaging interface at the second user device within a message bubble, as shown in FIG. 5E. In some embodiments, the map is displayed within the corresponding instant messaging interface as a background of a chat window containing one or more previous chat messages, as shown in FIG. 5H. In some embodiments, the map replaces one or more chat messages that were previously displayed in the instant messaging interface, as shown in FIG. 5I.

In accordance with some embodiments, the first user device uses chat message inputs to determine the granularity level. In some embodiments, the chat message input includes a description of the first location. For example, when the description of the first location is on street level, the granularity level of the map is the street level. In accordance with the description of the first location, the first user device determines a granularity level of the map and displays the map in accordance with the determined granularity level. The more detailed is the address, the higher is the granularity level.

Figure 5J:
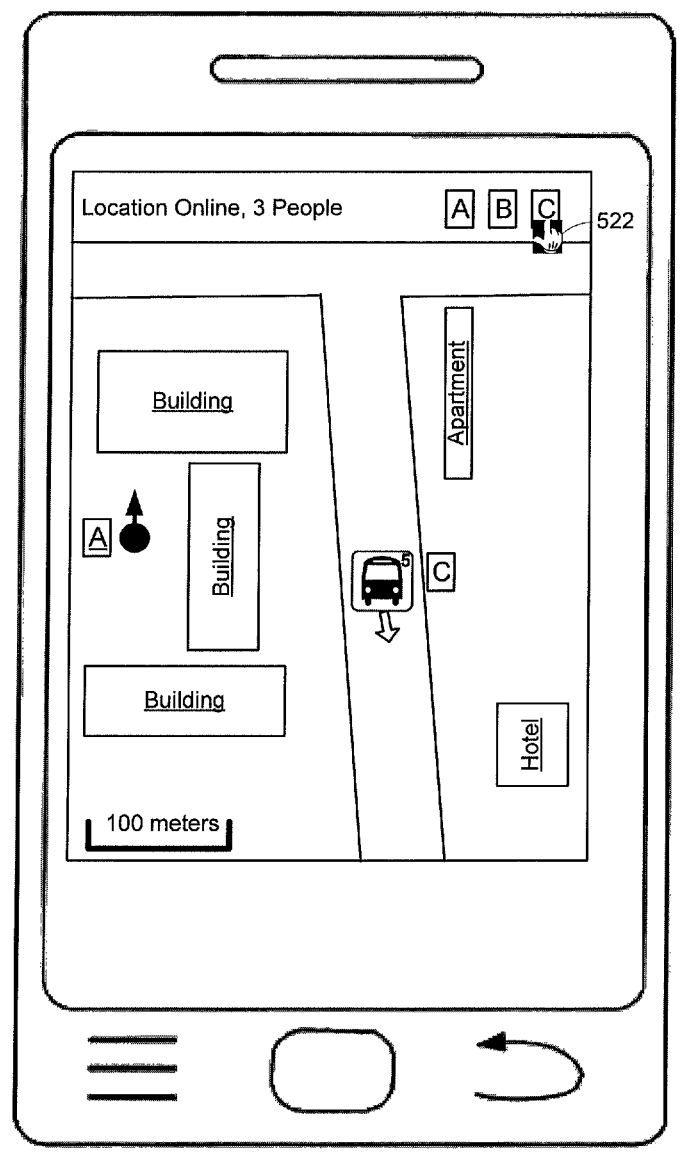
FIG. 5J is a schematic diagram of a user interface for sharing location information in accordance with some embodiments.

In accordance with some embodiments, when obtaining the map, the first user device acquires current locations of the first and/or second user devices, and marks the current locations of the first and/or second user devices in the map. FIG. 5J shows a map interaction that has three participants, Users A, B and C. When User A wants to see the location of User C, it moves the mouse to the upper right corner to click the button "C", (which could be C's name). In response to the selection, the user device shows the location of C.

In accordance with some embodiments, when obtaining the map, the first user device calculates a distance between the current location of the first user device and the current location of the second user device, and determining a scale of the map at least partly based on the calculated distance. For example, the first user device may automatically select a scale so that the map contains the both locations of the first and second user devices. The first user device may determine granularity level based on the scale.

In accordance with some embodiments, when obtaining the map, the first user device centers the map at least partly based on at least one of the current locations of the first and second user devices. In some embodiments, the first user device centers the map in a way that the locations of all participants in a map interaction are included in the map.

In accordance with some embodiments, in a step S404, the first user device shares the map with a second user device through the social network application, enabling the second user device to display the map in a corresponding instant messaging interface of the social network application executed at the second user device.

Figure 5K:
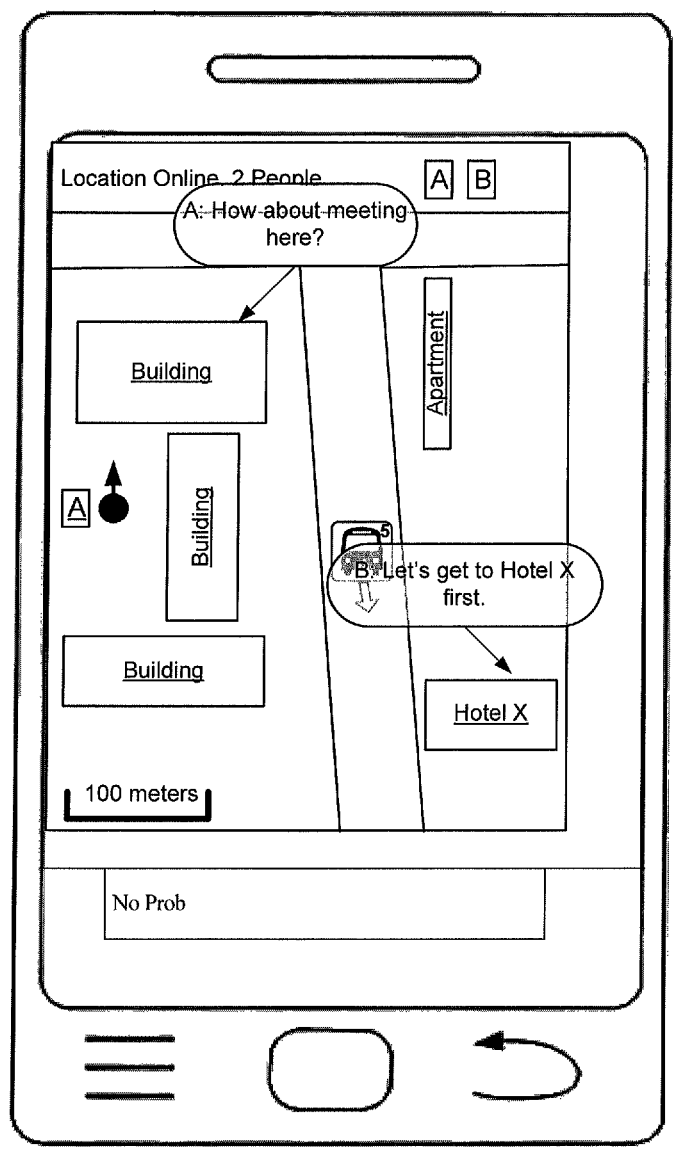
FIG. 5K is a schematic diagram of a user interface for sharing location information in accordance with some embodiments.

In accordance with some embodiments, sharing the map with the second user device through the social network application further comprises: detecting a send message command from the first user regarding the chat message input; and sending the map with a chat message corresponding to the chat message input to the second user. In some embodiments, the chat message is overlaid on the map displayed at the second user device. In some embodiments, the map replaces the normal chat message interface with the list of message bubbles. For example, FIG. 5K shows that two users are chatting using a map, their messages being overlaid on the map.

In some embodiments, the first user device is configured to receive map interaction request from other user devices as well. In some embodiments, the first user device receives a second map from a third user device through the social network application, and displays the second map within the instant messaging interface of the social network application.

In some embodiments, the first user device receives a map interaction request from the third user device; after receiving an acceptance of map interaction request from the first user, receives the second map from the third user device through the social network application; displays the second map within the instant messaging interface of the social network application; and receives and displays one or more changes to the map that are made on the third user device by a third user. In some embodiments, the one or more changes include at least one of changes of a scale of the map, a center of the map, a granularity of the map, a marking on the map, a chat message displayed on the map, and a direction to a destination on a map.

In some embodiments, the first user device receives directions to a destination from the third user device. In some embodiments, the direction is drawn by a third user of the third user device on the second map and displays the directions on the second map. In some embodiments, the direction is generated by the third user device after receiving the starting point and destination. In some embodiments, after receiving an instruction from the first user, the first user device exports the direction from the social network application to a map application having a position capability; and using the map application having the position capability to provide real-time guidance on directions in accordance with the directions received from the third user device. For example, in some embodiments, even the direction hand-drawn by another user on the screen, the social network application or the map application is able to convert the hand-drawn routes into actual direction by comparing the positions on map and actual geography. When a user receiving the direction from the third user, who may have better knowledge of local traffic or roads than a typical GPS, the user can use it as a real time GPS to travel to a destination.

In accordance with some embodiments, in a step S405, the first user device receives a user input of a first location, either from the first user or from the second user device.

In accordance with some embodiments, when two or more devices are sharing one map, any markings of locations are displayed in all of the two or more devices. In some embodiments, after sharing the map with the second user device through the social network application, the first user device receives a selection of a first location on the map from the first user. The first user device marks the first location on the map, and sends the first location to the second user device, causing the second user device to mark the first location on the map displayed at the second user device.

In some embodiments, the first user device displays the map within the instant message interface at the first user device. After sharing the map with the second user device through the social network application, the first user device receives a selection of a first location on the map from the second user device. In response to the selection of the first location on the map from the second user device, the first user device marks the first location on the map displayed at the first user device.

In accordance with some embodiments, the first user device displays messages in the map when the first and second user devices are sharing the map. In some embodiments, when the first user device receives a chat message from one of the first user and the second user device, the first user device detects an indication that the chat message is associated with the first location. In response to detecting the indication that the chat message is associated with the first location, the first user device displays the chat message in the map in a manner to associate the chat message with the first location. For example, as shown in FIG. 5K, when user B said: "Let's get to Hotel X first," the user device of user B automatically obtains the location of Hotel X and displays the chat message in proximity of Hotel B.

In accordance with some embodiments, in a step S406, the first user device receiving a user input for exiting the map, and in response to the user input for exiting the map, removes the map from the instant messaging interface of the social network application.

Figure 5L:
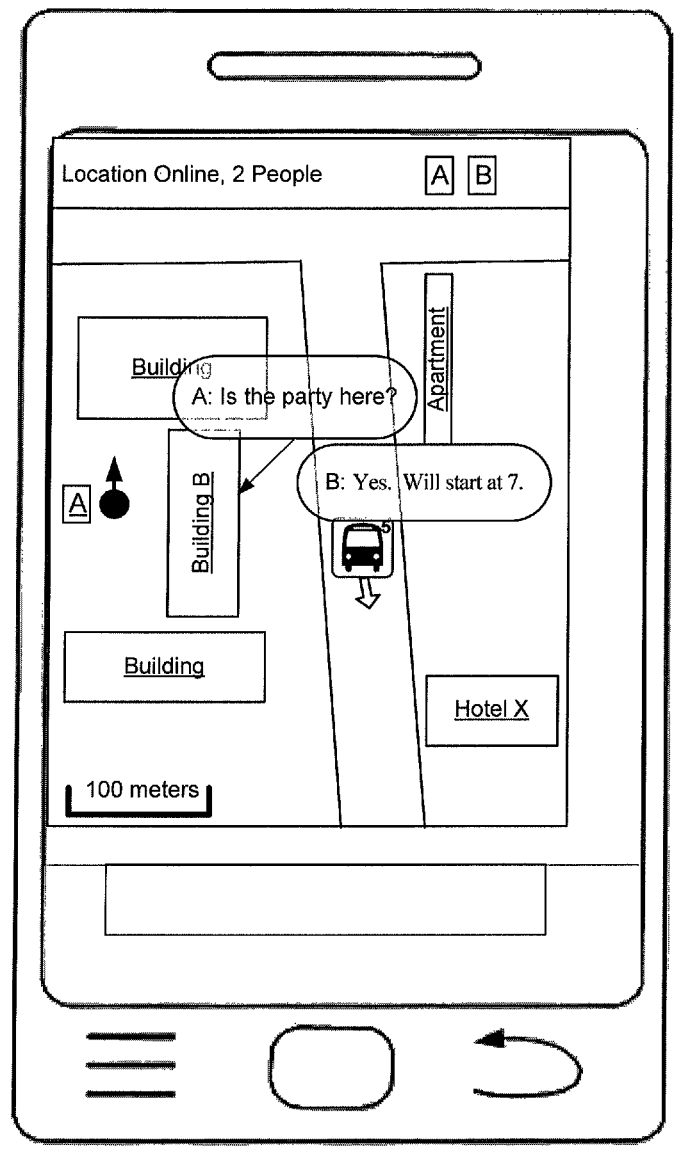
FIG. 5L is a schematic diagram of a user interface for sharing location information in accordance with some embodiments.
Figure 5M:
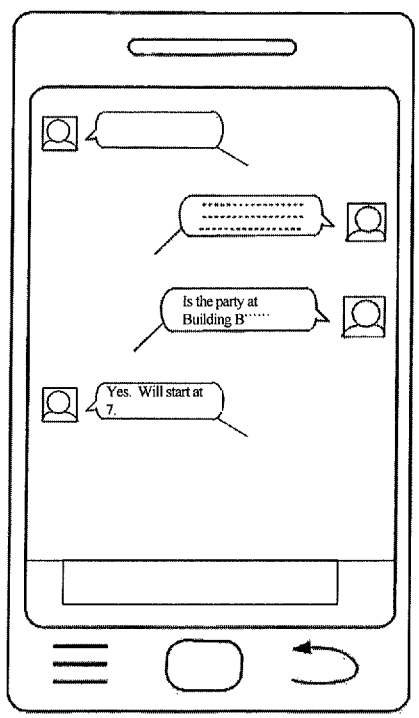
FIG. 5M is a schematic diagram of a user interface for sharing location information in accordance with some embodiments.

In accordance with some embodiments, after removing the map from the instant messaging interface of the social network application, the first user device, in the instant messaging interface, restores one or more chat messages that were previously replaced by the map. For example, the two chat messages shown in FIG. 5F are replaced by the map in FIG. 5H, and are restored after the map is exited, as shown in FIG. 5M.

In accordance with some embodiments, before receiving the user input for exiting the map, the first user device receives a selection of a first location in the map from the first user and marks the first location in the map. After removing the map from the instant messaging interface of the social network application, the first user device converts the first location into a text address, and displays the text address as at least part of a chat message sent from the first user device to the second user device. For example, as shown in FIGS. 5L and 5M, a user selects Building B and sends a message: "Is the party here?" When the map is removed, the message shows up in the message history and is converted into "Is the part at Building B . . . ."

Figure 6:
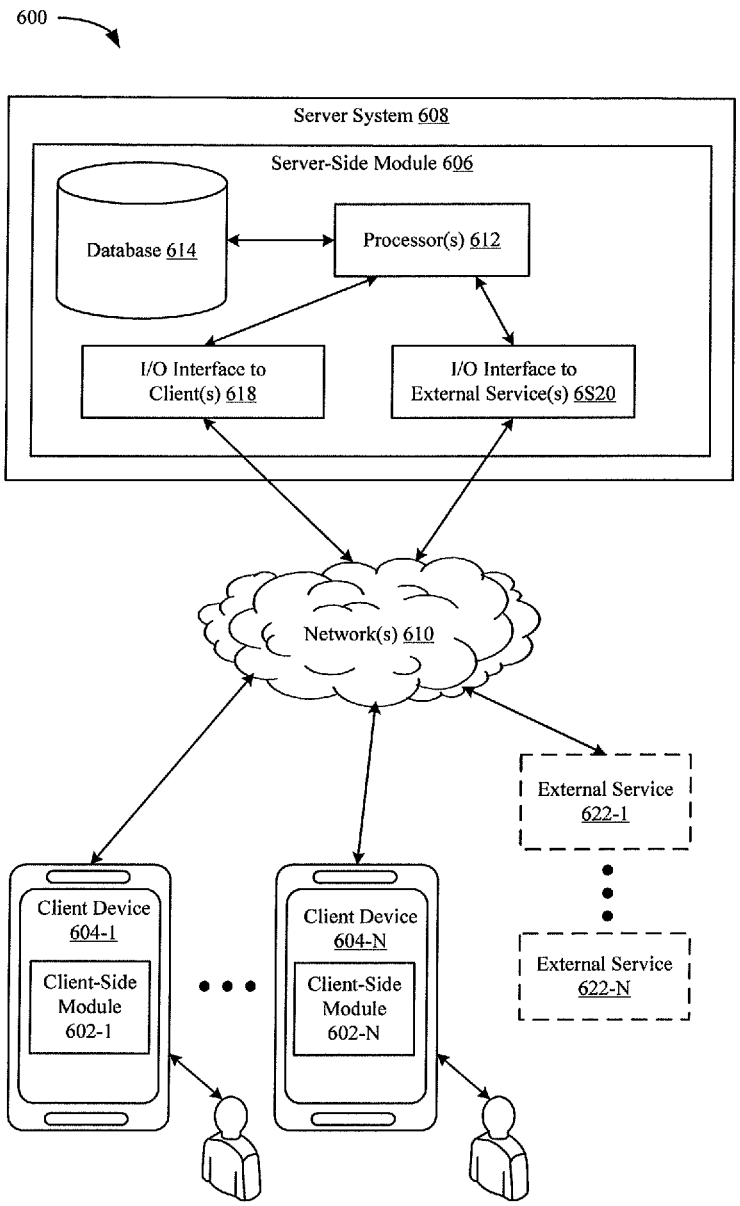
FIG. 6 is a block diagram of a server-client environment in accordance with some embodiments.

As shown in FIG. 6, location sharing is implemented in a server-client environment 600 in accordance with some embodiments. In some embodiments, server-client environment 600 includes client-side processing 602-1 . . . 102-N (hereinafter "client-side module 602") executed on a client device 604-1 . . . 104-N, and server-side processing 606 (hereinafter "server-side module 606") executed on a server system 608. Client-side module 602 communicates with server-side module 606 through one or more networks 610. Client-side module 602 provides client-side functionalities for the social networking platform (e.g., instant messaging, and social networking services) and communications with server-side module 606. Server-side module 606 provides server-side functionalities for the social networking platform (e.g., instant messaging, and social networking services) for any number of client modules 602 each residing on a respective client device 604.

In some embodiments, server-side module 606 includes one or more processors 612, one or more databases 614, an I/O interface to one or more clients 618, and an I/O interface to one or more external services 620. I/O interface to one or more clients 618 facilitates the processing of input and output associated with the client devices for server-side module 606. One or more processors 612 obtain instant messages from a plurality of users, process the instant messages, process location information of a client device, and share location information of the client device to client-side modules 602 of one or more client devices. The database 614 stores various information, including but not limited to, map information, service categories, service provider names, and the corresponding locations. The database 614 may also store a plurality of record entries relevant to the users associated with location sharing, and the instant messages exchanged among the users for location sharing. I/O interface to one or more external services 620 facilitates communications with one or more external services 622 (e.g., merchant websites, credit card companies, and/or other processing services).

Examples of client device 604 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 610 include local area networks (LAN) and wide area networks (WAN) such as the Internet. One or more networks 610 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 608 is implemented on one or more stand-alone data processing apparatuses or a distributed network of computers. In some embodiments, server system 608 also employs various virtual devices and/or services of third party service providers (e.g., third-party cloud service providers) to provide the underlying computing resources and/or infrastructure resources of server system 608.

Server-client environment 600 shown in FIG. 6 includes both a client-side portion (e.g., client-side module 602) and a server-side portion (e.g., server-side module 606). In some embodiments, data processing is implemented as a stand-alone application installed on client device 604. In addition, the division of functionalities between the client and server portions of client environment data processing can vary in different embodiments. For example, in some embodiments, client-side module 602 is a thin-client that provides only user-facing input and output processing functions, and delegates all other data processing functionalities to a backend server (e.g., server system 608).

Figure 7:
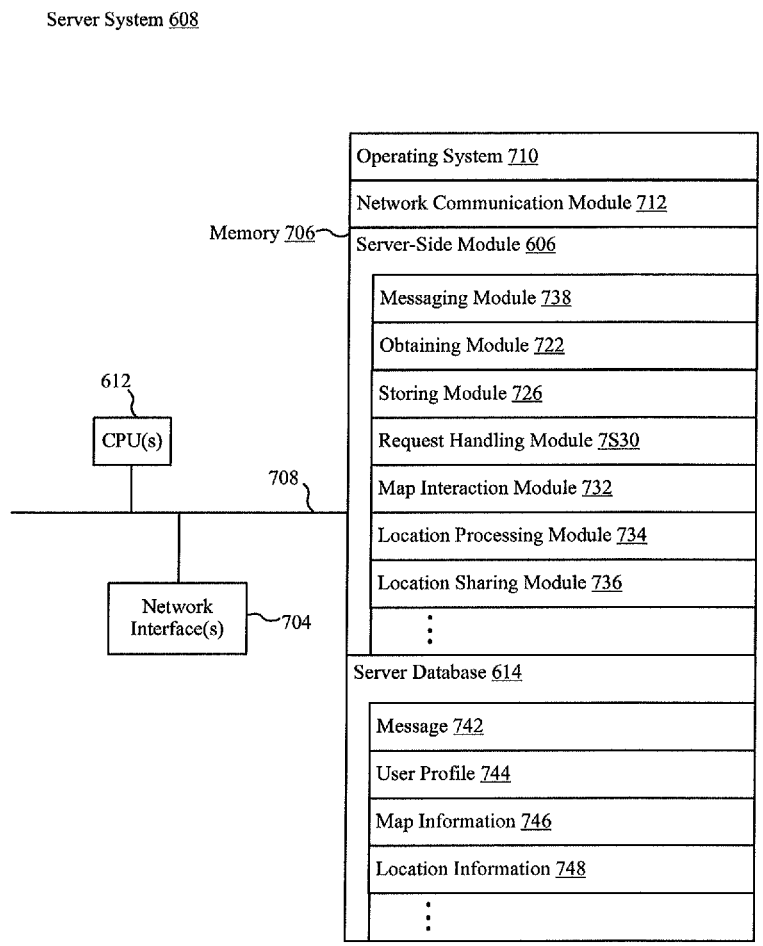
FIG. 7 is a block diagram of a server system in accordance with some embodiments.

FIG. 7 is a block diagram illustrating a server system 608 in accordance with some embodiments. Server system 608, typically, includes one or more processing units (CPUs) 612, one or more network interfaces 704 (e.g., including I/O interface to one or more clients 618 and I/O interface to one or more external services 620), memory 706, and one or more communication buses 708 for interconnecting these components (sometimes called a chipset).

Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 612. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

- operating system 710 including procedures for handling various basic system services and for performing hardware dependent tasks;
- network communication module 712 for connecting server system 608 to other computing devices (e.g., client devices 604 and external service(s) 622) connected to one or more networks 610 via one or more network interfaces 704 (wired or wireless);
- server-side module 606, which provides server-side data processing for the social networking platform (e.g., location information processing and sharing, instant messaging, and social networking services), includes, but is not limited to:
    - messaging module 738 for processing and routing instant messages exchanged among a first user and one or more second users of a social networking platform;
    - obtaining module 722 for obtaining location information of the first user from a client device 604 associated with the first user;
    - storing module 726 for storing various information in the database 614, the various information including map information, service categories, server provider names, user locations, and entries relevant to the instant messages exchanged during a chat session;
    - request handling module 730 for handling and responding to various requests sent from client devices of the social networking platform;
    - map interaction module 732 for detecting map interaction trigger input from user messages and receiving and forwarding map interaction requests;
    - location processing module 734 for processing location information of the user for sharing, including obtaining current locations of users and convert user input of location information into positions on maps; and
    - location sharing module 736 for sharing maps among users and synchronizing map and location information for users who are displaying the same maps; and
- one or more server database 614 storing data for the social networking platform, including but not limited to:
    - messages 742 storing messages exchanged among a plurality of users associated with location sharing;
    - user profiles 744 storing user profiles for the plurality of users associated with location sharing, wherein a respective user profile for a user may include a user/account name or handle, login credentials to the social networking platform, location information of the user (e.g., previous location information), payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user;
    - map information 746 storing geographical information of various locations, including geographical locations, and various services and business on the maps; and
    - location information 748 storing location information associated with or inputted by one or more of the plurality of users.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
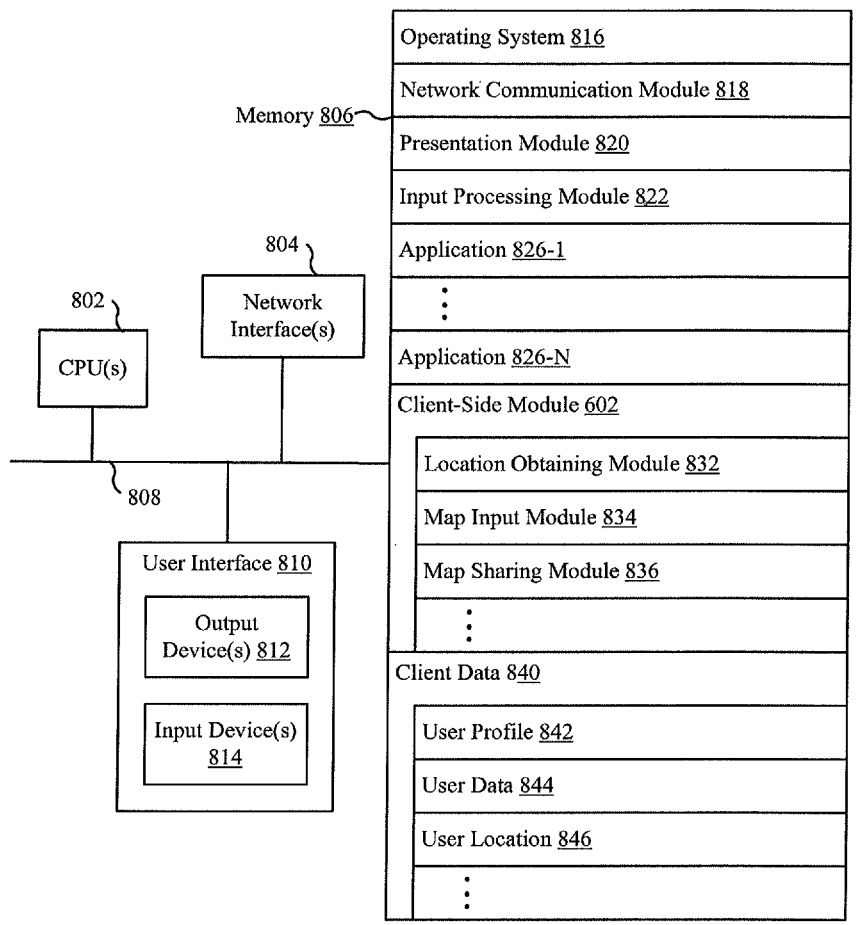
FIG. 8 is a block diagram of a client device in accordance with some embodiments.

FIG. 8 is a block diagram illustrating a representative client device 604 associated with a user in accordance with some embodiments. Client device 604, typically, includes one or more processing units (CPUs) 802, one or more network interfaces 804, memory 806, and one or more communication buses 808 for interconnecting these components (sometimes called a chipset). Client device 604 also includes a user interface 810. User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 604 use a microphone and voice recognition or a camera and gesture recognition to supplement or replace the keyboard.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

operating system 816 including procedures for handling various basic system services and for performing hardware dependent tasks;

network communication module 818 for connecting client device 604 to other computing devices (e.g., server system 608 and external service(s) 622) connected to one or more networks 610 via one or more network interfaces 804 (wired or wireless);

presentation module 820 for enabling presentation of information (e.g., a user interface for a social networking platform, widget, webpage, game, and/or application, audio and/or video content, text, etc.) at client device 604 via one or more output devices 812 (e.g., displays, speakers, etc.) associated with user interface 810;

input processing module 822 for detecting one or more user inputs or interactions from one of the one or more input devices 814 and interpreting the detected input or interaction;

one or more applications 826-1-826-N for execution by client device 604 (e.g., games, application marketplaces, payment platforms, social network platforms, and/or other applications); and client-side module 602, which provides client-side data processing and functionalities for location sharing, including but not limited to:

location obtaining module 832 for obtaining current location of a user or locations input by the user associated with the client device;

map input module 832 for detecting trigger input of map interactions, displaying maps in the social network applications, and map sharing module system 832 for sharing maps with other users and receiving maps shared by other users; and client data 840 storing data of a user associated with the client device, including, but is not limited to:

user profile 842 storing a user profile associated with the user of client device 604 including a user/account name or handle, login credentials for location sharing, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user;

user data 844 storing data authored, saved, liked, or chosen as favorites by the user of client device 604 in a social networking platform; and user location 846 storing location information of the user of the client device, including current location information and previous location information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some embodiments, at least some of the functions of server system 608 are performed by client device 604, and the corresponding sub-modules of these functions may be located within client device 604 rather than server system 608. In some embodiments, at least some of the functions of client device 604 are performed by server system 608, and the corresponding sub-modules of these functions may be located within server system 608 rather than client device 604. Client device 604 and server system 608 shown in FIGS. 7-10, respectively, are merely illustrative, and different configurations of the modules for implementing the functions described herein are possible in various embodiments.

Figure 9:
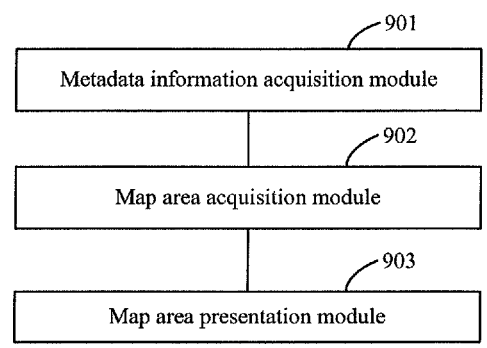
FIG. 9 is a block diagram of a client device in accordance with some embodiments.

FIG. 9 is a structural block diagram of an apparatus (e.g., client device 604 as shown in FIG. 6) for presenting a geographical location in accordance with some embodiments. As shown in FIG. 9, the apparatus comprises a metadata information acquisition module 901, a map area acquisition module 902 and a map area presentation module 903.

In accordance with some embodiments, the metadata information acquisition module 901 is used for acquiring the metadata information of a geographical location. The map area acquisition module 902 is connected with the metadata information acquisition module 901, for acquiring the map area including the geographical location. The map area presentation module 903 is connected with the map area acquisition module 902, for presenting the map area including the geographical location.

Alternatively, the map area acquisition module is used for acquiring the map corresponding to the presentation granularity; determining the display location of the geographical location in the acquired map according to the longitude and latitude data; and taking the display position as the center and taking a screenshot of the map according to the size of the preset presentation box to obtain the map area including the geographical location.

In some embodiments, the apparatus further comprises:
a thread creation module for creating the map control loading thread;
a map control loading module for loading the map control through the map control loading thread; and
a map area acquisition module for loading the map through the map control and acquiring the map area including the geographical location from the loaded map.

Figure 10:
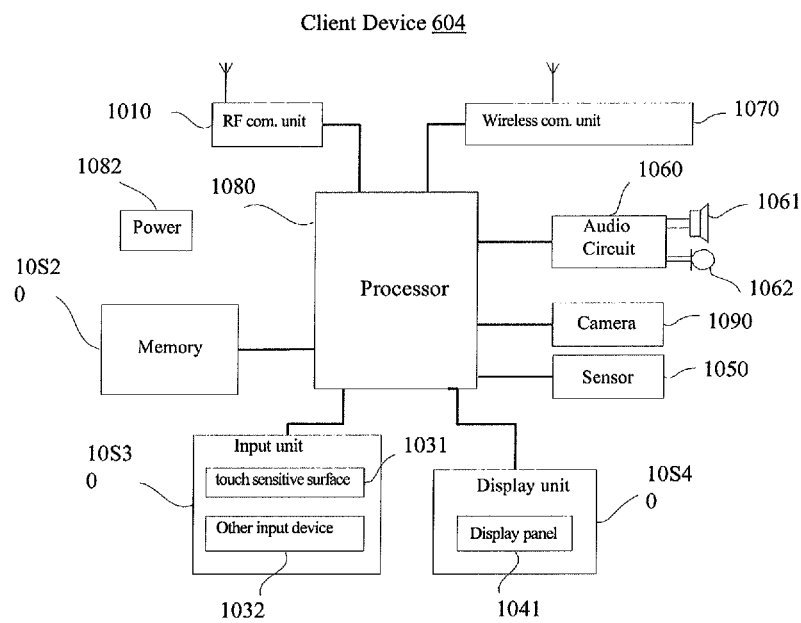
FIG. 10 is a block diagram of a client device in accordance with some embodiments.

FIG. 10 is a block diagram of a client device (e.g., Client device 604 in FIG. 6) in accordance with some embodiments. The terminal is used to implement the geographical location presentation method provided in the embodiment above-mentioned. The terminal of the embodiment of the present application may comprise one or more of the following components: a processor for executing computer program instructions to complete various processes and methods, a random access memory (RAM) and a read-only memory (ROM) for storing information and program instructions, a memory for storing data and information, an I/O device, an interface, an antenna, etc.

Particularly, the client device 604 may comprise the following parts: an RF (Radio Frequency) circuit 1010, a memory 1020, an input unit 1030, a display unit 1040, sensors 1050, an audio circuit 1060, a Wi-Fi (Wireless Fidelity) module 1070, a processor 1080, a power supply 1082, a camera 1090 and the like. Those skilled in the art can understand that the terminal is not limited to the structure shown in FIG. 10, and may include more or fewer parts than those shown in FIG. 10, or some parts may be combined, or different arrangement of parts may be adopted.

Each part of the client device 604 is introduced in detail as follows in connection with FIG. 10.

The RF circuit 1010 may be used for receiving and sending a signal during transceiving information or calling, particularly may be used for sending downlink information from a base station to the processor 1080 for processing after receiving the downlink information and additionally may be used for sending uplink data to the base station. Generally, the RF circuit comprises, but not limited to, an antenna, at least one amplifier, a transceiver, a coupler, an LNA (Low Noise Amplifier), a duplexer and the like. Furthermore, the RF circuit 1010 also may be communicated with other equipment by wireless communication and the network. Any one of communication standards or protocols can be used for wireless communication, which includes, but not limited to, GSM (Global System of Mobile Communication), GPRS (General Packet Radio Service), CDMA (Code Division Multiple Access), WCDMA (Wideband Code Division Multiple Access), LTE (Long Term Evolution), E-mail, SMS (Short Messaging Service) and the like.

The memory 1020 may be used for storing software programs and software modules. The processor 1080 executes various functional applications and data processing of the client device 604 by operating the software programs and the software modules, stored in the memory 1020. The memory 1020 may mainly comprise a program storage region and a data storage region, wherein the program storage region may be used for storing operating systems, applications required by at least one function (such as a sound play function, an image play function etc.,) and the like; and the data storage region may be used for storing data (such as audio data, a telephone book etc.,) and the like which are created according to use of the client device 604. Furthermore, the memory 1020 may include a high speed RAM (Random Access Memory) and also may include a non-volatile memory, such as at least one disk storage device, a flash memory device or other volatile solid storage devices.

The input unit 1030 may be used for receiving input number or character information and generating key signal inputs related to user's setting and functional control of the client device 604. Specifically, the input unit 1030 may comprise a touch control panel 1031 and other input equipment 1032. The touch control panel 1031, also called a touch screen, may be used for detecting touch operations of a user on or near the touch control panel 1031 (for example, operations carried out by the user through using any suitable objects or attachments, such as a finger, a touch pen and the like, on the touch control panel 1031 or near the touch control panel 1031) and driving corresponding apparatus connected therewith according to a preset program. Optionally, the touch control panel 1031 may include a touch detection apparatus and a touch controller. The touch detection apparatus detects the touch direction of the user, detects a signal caused by the touch operation and transmits the signal to the touch controller. The touch controller receives touch information from the touch detection apparatus, converts the touch information into contact coordinates and then sends the contact coordinates to the processor 1080 and may receive a command sent by the processor 1080 and execute the command. Moreover, the touch control panel 1031 may be of various types, such as resistance type, capacitance type, infrared type, surface acoustic wave type and the like. Except the touch control panel 1031, the input unit 1030 also may include other input equipment 1032. Specifically, other input equipment 1032 may include, but not limited to, one or more of physical keyboard, virtual (function) keys (such as a volume control key, a switching key and the like), trackball, mouse, joystick and the like.

The display unit 1040 may be used for displaying information input by the user or information provided for the user and various menus of the client device 604. The display unit 1040 may include a display panel 1041. Optionally, the display panel 1041 may be configured in forms of an LCD (Liquid Crystal Display), an OLED (Organic Light-Emitting Diode) and the like. Furthermore, the touch panel 1031 may cover the display panel 1041. When the touch panel 1031 detects a touch operation on or near it, the signal caused by the touch operation is transmitted to the processor 1080 to determine the type of a touch event. Then the processor 1080 provides a corresponding visual output on the display panel 1041 according to the type of the touch event. In FIG. 10, the touch panel 1031 and the display panel 1041 are used as two independent parts for accomplishing input and output functions of the client device 604, however, in certain embodiments, the touch panel 1031 and the display panel 1041 may be integrated to accomplish the input and output functions of the client device 604.

The client device 604 also may include at least one sensor 1050, such as gyroscope sensors, magnetic induction sensors, optical sensors, motion sensors and other sensors. Specifically, optical sensors may include an environmental light sensor and a proximity sensor, wherein the environmental light sensor may regulate brightness of the display panel 1041 according to the lightness of environmental light. The proximity sensor may shut down the display panel 1041 and/or backlight when the client device 604 approaches an ear. As one of the motion sensors, an accelerometer sensor may detect the value of an acceleration in each direction (generally, in three axial directions), may detect the value and the direction of gravity in a static state, which may be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors, may be integrated into the client device 604, to which explanation are not repeated herein.

The audio circuit 1060, a speaker 1061 and a microphone 1062 may provide an audio interface between the user and client device 604. The audio circuit 1060 may transmit an electric signal obtained by converting received audio data to the speaker 1061. The electric signal is converted into a sound signal to be output by the speaker 1061. On the other hand, the microphone 1062 converts a collected sound signal into an electric signal. The audio circuit 1060 receives the electric signal and converts the electric signal into audio data. After the audio data is output to the processor 1080 and is processed, it is sent, for example, to another terminal through the RF circuit 1010, or is output to the memory 1020 in order to be further processed.

Wi-Fi belongs to the technology of short distance wireless transmission. The client device 604 can help the user to receive and send emails, browse webpages, access streaming media and the like by the Wi-Fi module 1070. The Wi-Fi module 1070 provides wireless broadband internet access for the user. Although the Wi-Fi module 1070 is shown in FIG. 10, it should be understood that the Wi-Fi module 1070 is not the necessary composition of the client device 604 and may completely be omitted as required without changing the scope of the application.

The processor 1080 is a control center of the client device 604, is connected with all the parts of the whole terminal by various interfaces and lines and is used for executing various functions of the client device 604 and processing the data by operating the software programs and/or the modules stored in the memory 1020, and calling the data stored in the memory 1020 so as to carry out integral monitoring on the terminal. Optionally, the processor 1080 may include one or more processing units. Preferably, the processor 1080 may be integrated with an application processor and a modulation-demodulation processor, wherein the application processor is mainly used for an operating system, a user interface, applications and the like, and the modulation-demodulation processor is mainly used for wireless communication. It should be understood that the modulation-demodulation processor may also be not integrated into the processor 1080.

The client device 604 further includes the power supply 1082 (such as a battery) for supplying power to each part. Preferably, the power supply may be logically connected with the processor 1080 by a power supply management system so as to implement functions of charge management, discharge management, power consumption management and the like by the power supply management system.

The camera 1090 generally comprises a lens, an image sensor, an interface, a digital signal processor, a CPU, a display screen, etc. Wherein the lens is fixed above the image sensor and may be manually regulated to vary the focusing; the image sensor equals to the "film" of a conventional camera and is the "heart" of the camera for collecting images; the interface is used for connecting the camera with a motherboard of the terminal through flex cable, a board-to-board connector or spring connection, and sends the collected images to the memory 1020; and the digital signal processor converts the analog image collected into digital images through arithmetical operation and sends them to the memory 1020 through the interface.

Though not shown, the client device 604 may further include a Bluetooth module and the like, and descriptions of them are not repeated herein.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the technology to the precise forms disclosed. Many modifications and variations are possible in view of the above teachings. The implementations were chosen and described in order to best explain principles of the technology and its practical applications, to thereby enable others skilled in the art to best utilize the technology and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of sharing location information in a social network application, comprising:
    at a first user device having one or more processors and memory for storing one or more programs to be executed by the one or more processors:
        providing an instant messaging interface of the social network application at the first user device;
        detecting, within the instant messaging interface, a trigger input from a first user of the first user device, the trigger input is associated with location information of the first user device;
        in response to the trigger input associated with location information, obtaining a map of a location of the first user device based on the trigger input; and
        sharing the map of the location of the first user device with a second user device through the social network application, enabling the second user device to display the map of the location of the first user device in a corresponding instant messaging interface of the social network application executed at the second user device.

2. The method of claim 1, wherein detecting the trigger input associated with location information further comprises:
    detecting a chat message input containing one or more keywords associated with location information.

3. The method of claim 2, wherein the chat message input is detected in a message input box on the instant message interface, and the method further comprises:
    in response to detecting the chat message input associated with location information, displaying the map of the location of the first user device within the instant message interface at the first user device.

4. The method of claim 2, wherein the chat message input is a voice message input, and the method further comprises:
    converting the voice message input into text;
    extract an address from the text;
    marking a location corresponding to the address in the map of the location of the first user device as a first location; and
    displaying the address in a manner to associate the address with the first location in the map of the location of the first user device.

5. The method of claim 1, further comprising:
    receiving a chat message from one of the first user and the second user device;
    detecting an indication that the chat message is associated with a first location; and
    in response to detecting the indication that the chat message is associated with the first location, displaying the chat message in the map of the location of the first user device in a manner to associate the chat message with the first location.

6. The method of claim 1, further comprising:
    after sharing the map of the location of the first user device with the second user device through the social network application, receiving a selection of a first location on the map of the location of the first user device from the first user;
    marking the first location on the map of the location of the first user device; and
    sending the first location to the second user device, causing the second user device to mark the first location on the map of the location of the first user device displayed at the second user device.

7. The method of claim 1, further comprising:
displaying the map of the location of the first user device within the instant message interface at the first user device;
after sharing the map of the location of the first user device with the second user device through the social network application, receiving a selection of a first location on the map of the location of the first user device from the second user device; and
in response to the selection of the first location on the map of the location of the first user device from the second user device, marking the first location on the map of the location of the first user device displayed at the first user device.

8. A device of sharing location information in a social network application, comprising:
one or more processors; and
memory storing one or more programs for execution by the one or more processors, the one or more programs including instructions for:
providing an instant messaging interface of a social network application at a first user device;
detecting, within the instant messaging interface, a trigger input from a first user of the first user device, the trigger input is associated with location information of the first user device;
in response to the trigger input associated with location information, obtaining a map of a location of the first user device based on the trigger input; and
sharing the map of the location of the first user device with a second user device through the social network application, enabling the second user device to display the map of the location of the first user device in a corresponding instant messaging interface of the social network application executed at the second user device.

9. The device of claim 8, wherein detecting the trigger input associated with location information further comprises:
detecting a chat message input containing one or more keywords associated with location information.

10. The device of claim 9, wherein the chat message input is detected in a message input box on the instant message interface, and the method further comprises:
in response to detecting the chat message input associated with location information, displaying the map of the location of the first user device within the instant message interface at the first user device.

11. The device of claim 9, wherein the chat message input is a voice message input, and the method further comprises:
converting the voice message input into text;
extract an address from the text;
marking a location corresponding to the address in the map of the location of the first user device as a first location; and
displaying the address in a manner to associate the address with the first location in the map of the location of the first user device.

12. The device of claim 8, wherein the operations further comprise:
receiving a chat message from one of the first user and the second user device;
detecting an indication that the chat message is associated with the first location; and
in response to detecting the indication that the chat message is associated with the first location, displaying the chat message in the map of the location of the first user device in a manner to associate the chat message with the first location.

13. The device of claim 8, wherein the operations further comprise:
after sharing the map of the location of the first user device with the second user device through the social network application, receiving a selection of a first location on the map of the location of the first user device from the first user;
marking the first location on the map of the location of the first user device; and
sending the first location to the second user device, causing the second user device to mark the first location on the map of the location of the first user device displayed at the second user device.

14. The device of claim 8, wherein the operations further comprise:
displaying the map of the location of the first user device within the instant message interface at the first user device;
after sharing the map of the location of the first user device with the second user device through the social network application, receiving a selection of a first location on the map of the location of the first user device from the second user device; and
in response to the selection of the first location on the map of the location of the first user device from the second user device, marking the first location on the map displayed at the first user device.

15. A non-transitory computer readable storage medium having instructions stored thereon, the instructions, when executed by one or more processors, cause the processors to perform operations comprising:
providing an instant messaging interface of a social network application at a first user device;
detecting, within the instant messaging interface, a trigger input from a first user of the first user device, the trigger input is associated with location information of the first user device;
in response to the trigger input associated with location information, obtaining a map of a location of the first user device based on the trigger input; and
sharing the map of the location of the first user device with a second user device through the social network application, enabling the second user device to display the map of the location of the first user device in a corresponding instant messaging interface of the social network application executed at the second user device.

16. The non-transitory computer readable storage medium of claim 15, wherein detecting the trigger input associated with location information further comprises:
detecting a chat message input containing one or more keywords associated with location information.

17. The non-transitory computer readable storage medium of claim 16, wherein the chat message input is detected in a message input box on the instant message interface, and the operations further comprises:
in response to detecting the chat message input associated with location information, displaying the map of the location of the first user device within the instant message interface at the first user device.

18. The non-transitory computer readable storage medium of claim 16, wherein the chat message input is a voice message input, and the method further comprises:

converting the voice message input into text;
extract an address from the text;
marking a location corresponding to the address in the map of the location of the first user device as a first location; and
displaying the address in a manner to associate the address with the first location in the map.

19. The non-transitory computer readable storage medium of claim 15, wherein the operations further comprise:
receiving a chat message from one of the first user and the second user device;
detecting an indication that the chat message is associated with a first location; and
in response to detecting the indication that the chat message is associated with the first location, displaying the chat message in the map of the location of the first user device in a manner to associate the chat message with the first location.

20. The non-transitory computer readable storage medium of claim 15, wherein the operations further comprise:
after sharing the map of the location of the first user device with the second user device through the social network application, receiving a selection of a first location on the map of the location of the first user device from the first user;
marking the first location on the map of the location of the first user device; and
sending the first location to the second user device, causing the second user device to mark the first location on the map of the location of the first user device displayed at the second user device.

\* \* \* \* \*